Aug. 7, 1973 W. R. MEADORS 3,751,552
METHOD FOR DRAWING THERMOPLASTIC MATERIALS
Original Filed Dec. 1, 1966
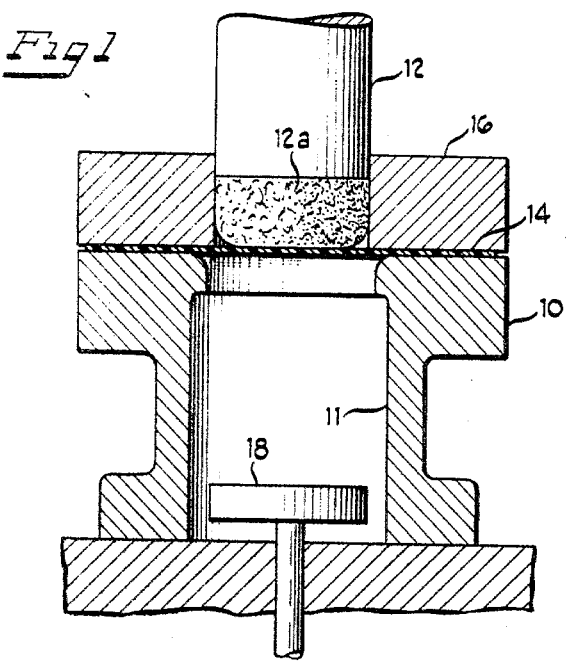
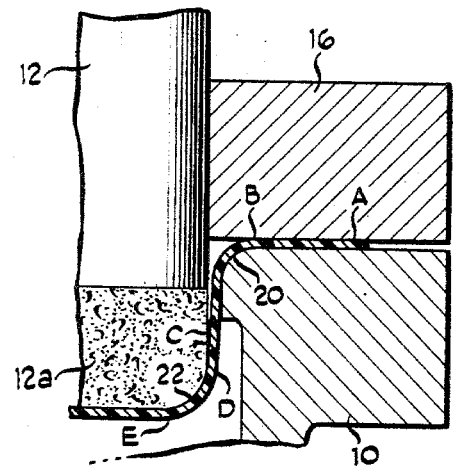
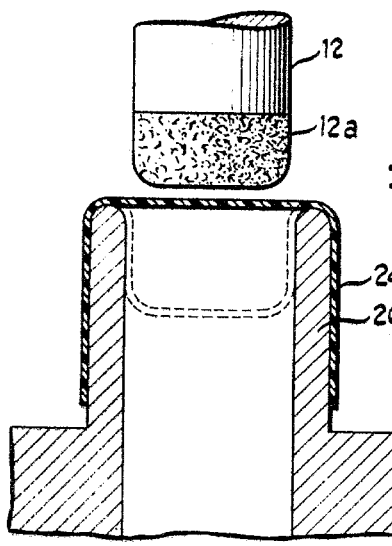
INVENTOR
WILLIAM R. MEADORS
BY Thomas B. Hunter
ATTORNEY

United States Patent Office 3,751,552
Patented Aug. 7, 1973

3,751,552
METHOD FOR DRAWING THERMOPLASTIC MATERIALS
William R. Meadors, Washington, W. Va., assignor to Borg-Warner Corporation, Chicago, Ill.
Continuation of application Ser. No. 835,826, Jan. 31, 1969, which is a division of application Ser. No. 598,500, Dec. 1, 1966, both now abandoned. This application Jan. 12, 1972, Ser. No. 217,403
Int. Cl. B29c 17/03
U.S. Cl. 264—320      2 Claims

ABSTRACT OF THE DISCLOSURE

In the deep drawing of synthetic thermoplastic sheet material, the present invention uses a roughened surface on the terminal portion or nose of the punch. The function of this roughened punch surface is to firmly engage and grip the material as it is wrapped over the end of the punch during the drawing operation. Contact with the roughened surface will reduce the flow of material as it is in the process of being stretched across this region so that thinning is mitigated.

---

This is a continuation of application Ser. No. 835,826 filed Jan. 31, 1969, now abandoned which is, in turn, a division of application Ser. No. 598,500, filed Dec. 1, 1966, also now abandoned.

This invention relates generally to a method and apparatus for drawing plastic materials and more particularly to the cold forming of deep-drawn articles from plastic sheet stock.

It is a principal object of the invention to provide an improved process for cold forming or drawing thermoplastic material.

Another object of the invention is to provide a method for deep-drawing plastic materials which minimizes rejects resulting from tears or break-throughs in the wall during drawing, or from excessive thinning of the wall to the extent that the article lacks structural integrity.

Another object of the invention is to provide an improved process in accordance with the foregoing objects in which articles may be deep-drawn in single or multiple straight drawing operations or, alternatively, may be formed by reverse drawing.

Another object of the invention is to provide improved apparatus for drawing plastic materials which is capable of producing deep-drawn articles having substantially uniform wall thicknesses.

Additional objects and advantages will be apparent from reading the following detailed description in conjunction with the drawings wherein;

FIG. 1 is a cross-sectional view of the improved drawing apparatus constructed in accordance with the principles of the invention;

FIG. 2 is a detailed cross-sectional view of the punch and die after a cup has been partially drawn; and FIG. 3 is a cross-sectional view of a portion of the drawing apparatus illustrating a reverse draw of sheet material.

Heretofore, the drawing of plastic sheet material has been extremely difficult, particularly with regard to deep-drawn profiles (height/diameter $\geq 1$). One of the main reasons for this is that as the sheet material is initially engaged by the end of the punch (the male die member) it begins to wrap around the profile radius of the punch i.e., the region along the rim; and as the punch movement is continued relative to the die, the sheet material will stretch along the profile radius and tends to flow and thin out. If this stretching is uncontrolled, which is the case when a conventional polished punch is employed, the material flow and concomitant thinning will cause the punch to break through the material or produce a wall thickness which is under the specification tolerances.

Briefly stated, the present invention proposes to use a roughened surface, such as provided by abrading or other suitable methods, on the terminal portion or nose of the punch. The function of this roughened punch surface is to firmly engage and grip the material as it is wrapped over the end of the punch during the drawing operation. Contact with the roughened surface will reduce the flow of material as it is in the process of being stretched across this region so that the thinning effect is mitigated.

Referring now to the drawings, a preferred form of apparatus used in carrying out the invention comprises a lower die body 10 which is provided with a cylindrical cavity 11, and a punch 12 or male die member telescopically receivable within the die cavity. While various shapes may be produced from a drawing operation, this specification will refer to the drawing of cup-shaped shells which will suffice for purposes of explanation. Accordingly, the configuration of the cavity is shown as being generally cylindrical and the punch has a complementary cylindrical shape.

The plastic sheet stock 14 is held in position over the upper surface of the die by means of a clamping ring 16. A knock-out pin 18 may be provided in the lower portion of the die to assist in removing the finished article. While the mechanism for driving the punch 12 and for holding the clamping ring against the upper surface of the die is not illustrated in the drawings, such mechanism is conventional, as shown for example in U.S. Pat. 2,778,765.

The nose or terminal portion of the punch 12 is provided with a roughened surface, indicated at 12a, to insure that relative movement and slippage between the sheet stock and the nose is held to a minimum. This roughened surface can be provided by any number of well-known methods such as sand blasting, acid etching, metal or ceramic flame spraying, abrading or other mechanical roughening or by using a separate sintered metal tip which can be secured to the main body of the punch. It should be pointed out that surface 12a on the punch may be characterized as randomly scored. This is in contrast to a fluted, uniformly grooved surface such as shown in U.S. Pat. 3,231,937 where the purpose and function of such grooving is entirely different.

The surface characteristics may be defined in terms of microinches RMS which is the root of the mean of the squares. Conventional surface roughness measuring apparatus is available which can be used to determine actual RMS values. An example of such apparatus is the Brush Model MS–50000 Surface Measuring System. It has been found that good results are obtained when the surface roughness is above 25 microinches RMS and the optimum surface roughness is between 60 and 80 microinches RMS. These values are critical in that when a polished punch is used i.e., one with a surface roughness well below 25 microinches RMS, the articles are often torn or have other serious defects.

This tearing phenomenon is directly related to stresses and strains which take place during the drawing operation. For purposes of definition, stress may be considered as the force transmitted per area unit of material, and strain is the physical deformation or change in dimensions (either plastically or elastically) which results from the stress. With reference to FIG. 2 which shows a partially drawn cup, the material located between the clamping ring and the die in the area from A to B is drawn under radial tensile stress which is combined with hoop compressive stress and some lateral pressure due to the axially directed force of the clamping ring. The hoop strain or change in circumferential dimensions is related to the change in radial width for any particular section under consideration and also to the change in thickness. It is apparent that although any of these dimensions may change, the volume of material remains the same. The profile radius of the die, indicated at 20, in the area from B to C is plastically bent under radial tension. This produces thinning where the severity of stress is dependent upon the curvature of the radius and the amount of radial tension. Thinning also occurs along the section indicated at C due to plastic unbending. In the area from C to D the principal stress is tensile in that direction corresponding to the axially applied punch load. One of the most critical areas is in the zone between D and E around the profile radius of the punch. As the material is first engaged by the punch, bending forces are applied which, in combination with the stretching between D and C, produce a tendency for the material to flow across the profile radius 22 of the punch. In the drawing of metal where the smooth or polished punches are normally employed, this flow is not too important; but in the drawing of plastic sheet stock, the flow can be so rapid as to permit the punch to break through the thinning section.

According to the present invention, the roughened surface grips the sheet stock in the area of the greatest applied forces and resists the flow of material in the vicinity of the punch profile radius. The invention as heretofore described is applicable not only to straight drawing operations as depicted in FIGS. 1 and 2 but also to reverse drawing. As shown in FIG. 3, a preformed cup 24, formed, for example, by a straight drawing operation, is placed over the edge of the die 26. The punch engages the bottom of the cup and is wrapped over the nose of the punch as relative movement of the punch and the die continues. The same bending forces and the tendency of the material to flow are present in reverse drawing procedures.

The method and apparatus described herein have been found to be useful in drawing a variety of thermoplastic materials of varying thicknesses. Particularly good results, however, have been obtained with ABS materials, a graft copolymer of polybutadiene, styrene and acrylonitrile.

While this invention has been described in connection with certain specific embodiments thereof, it is to be understood that this is by way of illustration and not by way of limitation; and the scope of the appended claims should be construed as broadly as the prior art will permit.

What is claimed is:

1. A method of deep-drawing synthetic thermoplastic sheet material including the steps of bringing the sheet stock, maintained at substantially room temperature, into engagement with the terminal portion of a punch, said terminal portion having a roughened surface characterized by randomly scored discontinuities exceeding 25 microinches (RMS); effecting relative movement between said punch and a die, said die having a cavity for telescopically receiving said punch to wrap the sheet material over the roughened terminal portion; continuing the relative movement to a position whereby the sheet material is completely wrapped over said roughened terminal portion; discontinuing the relative movement when the height of the drawn article is at least as great as its diameter; and thereafter separating said punch and said die to permit removal of the drawn article.

2. A method as defined in claim 1 wherein said thermoplastic sheet material consists essentially of a graft copolymer of polybutadiene, styrene and acrylonitrile.

References Cited

UNITED STATES PATENTS

| | | | |
|---|---|---|---|
| 3,470,291 | 9/1969 | Johnson | 264—249 |
| 3,420,930 | 1/1969 | Lurie | 264—323 X |
| 3,349,153 | 10/1967 | Beck | 264—292 X |
| 3,264,392 | 8/1966 | Taplin | 264—294 X |
| 3,041,131 | 6/1962 | Juras | 264—338 X |
| 2,669,752 | 2/1954 | Pratt | 264—332 X |

FOREIGN PATENTS 964,138   1957   Germany.

ROBERT F. WHITE, Primary Examiner

R. R. KUCIA, Assistant Examiner

U.S. Cl. X.R.

264—293, 294